US011904570B2

(12) United States Patent
Schalk

(10) Patent No.: US 11,904,570 B2
(45) Date of Patent: Feb. 20, 2024

(54) APPARATUS FOR THE PRODUCTION OF A CUSHION PRODUCT

(71) Applicant: Sprick GmbH Bielefelder Papier-und Wellpappenwerke & Co., Bielefeld (DE)

(72) Inventor: Bastian Schalk, Detmold (DE)

(73) Assignee: Sprick GmbH Bielefelder Papier-Und Wellpappenwerke & Co., Bielefeld (DE)

( * ) Notice: Subject to any disclaimer, the term of this patent is extended or adjusted under 35 U.S.C. 154(b) by 31 days.

(21) Appl. No.: 16/678,881

(22) Filed: Nov. 8, 2019

(65) Prior Publication Data

US 2020/0070460 A1 Mar. 5, 2020

Related U.S. Application Data

(63) Continuation of application No. PCT/EP2018/061848, filed on May 8, 2018.

(30) Foreign Application Priority Data

May 8, 2017 (DE) ........................ 102017109851.8

(51) Int. Cl.
*B31D 5/00* (2017.01)
*B31F 1/10* (2006.01)

(52) U.S. Cl.
CPC .............. *B31D 5/0052* (2013.01); *B31F 1/10* (2013.01); *B31D 2205/0035* (2013.01); *B31D 2205/0047* (2013.01); *B31D 2205/0082* (2013.01)

(58) Field of Classification Search
CPC ......... B31D 5/0039–04; B31D 2205/00–0094; B31F 1/10; B26D 1/405; B26D 1/626; B26D 7/1818; B26F 1/08; B26F 1/20
See application file for complete search history.

(56) References Cited

U.S. PATENT DOCUMENTS 6,168,847 B1 * 1/2001 Murphy ............... B31D 5/0047 428/128
6,190,299 B1 * 2/2001 Simmons .................. B31F 1/10 493/464

(Continued)

FOREIGN PATENT DOCUMENTS

DE 195 36 367 A1 4/1997
DE 694 00 576 T2 4/1997

(Continued)

OTHER PUBLICATIONS

International Search Report and Written Opinion of the International Search Authority dated Aug. 22, 2018 in International Application No. PCT/EP2018/061884 (English and German languages) (14 pp.).

(Continued)

*Primary Examiner* — Anna K Kinsaul
*Assistant Examiner* — Luis G Del Valle
(74) *Attorney, Agent, or Firm* — Banner & Witcoff Ltd.

(57) ABSTRACT

An apparatus for the production of a cushion product from a single or multi-layer continuous paper strip includes a chute-like preforming station for the compression of a paper strip in the transverse direction and a deformation station following the preforming station in the feed direction of the paper strip having two embossing rollers engaging into each other in a deformation area in order to form the paper strip to a cushion product with at least one crumple hollow space extending in the longitudinal direction. The preforming station has a lifting unit and is positioned upstream in the feed direction of the embossing rollers for lifting a central area of the paper strip.

19 Claims, 4 Drawing Sheets

(56) References Cited

U.S. PATENT DOCUMENTS

| | | | | |
|---|---|---|---|---|
| 6,387,029 | B1 * | 5/2002 | Lencoski | B31D 5/0047 493/464 |
| 6,598,373 | B2 * | 7/2003 | Sperry | B31D 5/0073 53/403 |
| 6,632,165 | B1 | 10/2003 | Letourneau et al. | |
| 6,918,489 | B2 | 7/2005 | Harding et al. | |
| 10,625,484 | B2 * | 4/2020 | Chan | B31D 5/0047 |
| 2002/0082152 | A1 * | 6/2002 | Manley | B31D 5/0047 493/464 |
| 2003/0080540 | A1 | 5/2003 | Kinane | |
| 2008/0125301 | A1 * | 5/2008 | Manley | B31D 5/0047 493/464 |
| 2009/0004448 | A1 | 1/2009 | Tinianov | |
| 2011/0045217 | A1 * | 2/2011 | Kung | B31D 5/0043 493/464 |
| 2012/0289392 | A1 | 11/2012 | Cheich et al. | |
| 2017/0266907 | A1 * | 9/2017 | Chan | B65H 20/16 |
| 2020/0061951 | A1 * | 2/2020 | Slovencik | B65H 45/107 |

FOREIGN PATENT DOCUMENTS

| | | | |
|---|---|---|---|
| DE | 697 00 548 | T2 | 4/2000 |
| DE | 101 03 040 | A1 | 11/2001 |
| DE | 697 08 087 | T2 | 8/2002 |
| DE | 694 33 887 | T2 | 7/2005 |
| DE | 698 28 186 | T2 | 12/2005 |
| DE | 10 2012 018 867 | A1 | 3/2014 |
| DE | 10 2012 018 941 | A1 | 3/2014 |
| DE | 10 2012 218 679 | A1 | 4/2014 |
| DE | 10 2013 015 875 | A1 | 3/2015 |
| DE | 10 2014 016 874 | A1 | 5/2016 |
| DE | 10 2016 101 207 | A1 | 8/2016 |
| EP | 0 679 504 | A1 | 11/1995 |
| EP | 0 876 291 | | 11/1998 |
| EP | 1 497 049 | A2 | 1/2005 |
| EP | 1 964 804 | A2 | 9/2008 |
| EP | 2 171 167 | A1 | 4/2010 |
| EP | 2 711 168 | A1 | 3/2014 |
| EP | 2 719 526 | A1 | 4/2014 |
| FR | 2 970 921 | | 8/2012 |
| GB | 2 359 300 | A | 8/2001 |
| GB | 2501260 | A | 10/2013 |
| WO | WO 95/13914 | | 5/1995 |
| WO | WO 97/13097 | | 4/1997 |
| WO | WO 97/27136 | | 7/1997 |
| WO | WO 97/43097 | | 11/1997 |
| WO | WO 99/17923 | | 4/1999 |
| WO | WO 00/21723 | | 4/2000 |
| WO | WO 03/089163 | A2 | 10/2003 |
| WO | WO 2015/039756 | A1 | 3/2015 |
| WO | WO 2016/037764 | A1 | 3/2016 |
| WO | WO 2016/075001 | A1 | 5/2016 |
| WO | WO 2017/165321 | A1 | 9/2017 |
| WO | WO 2018/005902 | A1 | 1/2018 |

OTHER PUBLICATIONS

International Search Report and Written Opinion of the International Search Authority dated Jul. 20, 2018 in International Application No. PCT/EP2018/061848 (English and German languages) (10 pp.).

International Search Report and Written Opinion of the International Search Authority dated Jul. 20, 2018 in International Application No. PCT/EP2018/061860 (English and German languages) (10 pp.).

International Search Report and Written Opinion of the International Search Authority dated Jul. 20, 2018 in International Application No. PCT/EP2018/061685 (English and German languages) (10 pp.).

Office Action dated Feb. 8, 2018 for German Patent Application No. 10 2017 109 829.1, (10 pp.).

Office Action dated Dec. 12, 2017 for German Patent Application No. 10 2017 109 867.4, (10 pp.).

Office Action dated Dec. 5, 2017 for German Patent Application No. 10 2017 109 851.8, (10 pp.).

Office Action dated Nov. 28, 2017 for German Patent Application No. 10 2017 109 842.9, (10 pp.).

* cited by examiner 41
42
43
45
46
47
21
Ls
hk
Lk
bk
R
F
α
β
γ

APPARATUS FOR THE PRODUCTION OF A CUSHION PRODUCT

PRIORITY

This application is a continuation application of International PCT Patent Application No. PCT/EP2018/061848 filed on May 8, 2018, entitled "DEVICE FOR PRODUCING A CUSHIONING PRODUCT," which claims priority to German Patent Application No. 10 2017 109 851.8 filed on May 8, 2017, the entire contents of both of which are incorporated herein by reference.

TECHNICAL FIELD

The invention generally relates to an apparatus for the production of a cushion product.

BACKGROUND

In order to pack a large amount of items to be packed fast and transport-safe, the items are stored according to standardized packaging procedures and in packaging of standardized sizes. It is hereby important that the necessary cushion material is provided in constant quality and predefined three-dimensional dimensions in order to provide an efficient workflow.

Apparatuses according to the subject for the production of a cushion product from a single or multi-layered continuous paper strip are known for example from DE 10 2013 015 875 A1 and DE 10 2014 016 874 A1. There is a desire to provide large amounts of cushion material in possibly short time and without the involvement of paper jam, wherein a high cushion quality, i.e. a good damping ability of the cushion material, is provided.

SUMMARY

The invention relates to an apparatus for the production of a cushion product, for example of an endless cushion tube or a cushion pillow, from a single or multi-layered continuous paper strip. Fill material production apparatuses according to the subject are for example placed in logistic centers as displaceable, mobile units in order to provide length-customized or endless cushion material. The cushion material of cushion product is gathered from a compared to the cushion product space-saving paper strip supply like a paper strip roll or a paper strip Leporello stack. The paper strip is made from recycling paper. For the production of cushion material, the paper strip is stripped from a stack or a roll and formed in order to form air pockets which result in a damping between the shipping goods to be packed and the shipping container.

It is an objective of the embodiments to overcome the disadvantages of the prior art and particularly to provide an apparatus for the production of cushion products from a single or multi-layered continuous paper strip with regard to a possibly high cushion quality at high processing velocities. This task is solved by the embodiment of claim 1.

An apparatus according to one embodiment for the production of a cushion product from a single or multi-layer continuous paper strip is provided. The paper strip can be provided from a supply for example as coiled roll or Leporello stack. Preferably, the paper strip has a width of at least 30 cm and/or 200 cm at maximum, preferably between 50 cm and 100 cm, particularly a width of about 70 cm. The length-wise extension of the paper strip is at least 10, 50 or 100 times larger than the width of the paper strip. The thickness of the paper strip corresponds to the strength of a single or multi-layer paper strip material and is ably below 1 mm. The usage of recycling paper is to be favored due to its specific eco-friendliness.

The cushion product production apparatus according to one embodiment comprises a tube-like preforming station for compression of the paper strip in transverse direction. Preferably, the pre-forming station is designed to fold or roll the paper strip in transverse direction. The preforming station can have lateral chute inner walls, which form itself a chute-like narrowing preform contour in the feed direction of the paper strip.

The cushion product production apparatus according to one embodiment has a deforming station directly following the preforming station in the feed direction of the paper strip. The forming station comprises two embossing rollers engaging into each other in the deformation area in order to form the paper strip to a cushion product like a tube-like paper cushion with at least one crumple hollow space extending in lengthwise direction. The transverse direction of the paper strip is defined transverse to the feed direction of the paper strip and can comply with a transverse extension direction or width of the supply, respectively, preferably of the Leporello stack or the roll. Preferably, the transverse direction is defined at the inlet of the preforming station for example by a guiding unit like a deflection roll arranged there. The preforming station of the cushion product production apparatus according to one embodiment has a lifting unit directly arranged in front of the embossing rollers in the feed direction for lifting the central area of the paper strip. The lifting unit can be arranged in the feed direction in a rear area of the preforming station. Preferably, the lifting area is arranged close to the outlet of the preforming station or close to the deformation station. The lifting unit lifts a preformed paper strip that has already been preformed by parts of the preforming station, for example chute inner walls opposing each other in transverse direction. A lifting station can for example be realized pneumatically via pressured air or mechanically for example by a particularly free rotatable roll, a ramp or such. The lifting unit is designed to lift the paper strip perpendicularly to the feed direction of the paper strip and transverse to the transverse direction of the paper strip. It shall be clear that the length direction of the paper strip corresponds to the feed direction for a continuous feeding. The central area of the paper strip to be lifted is arranged central in the transverse direction of the particularly preformed paper strip. The central area of the paper strip is particularly arranged centrally in the transverse direction of the production apparatus, preferably of the deformation unit and/or the preforming station.

By the provision of a lifting unit upstream against the feed direction in front of the deformation station of an apparatus for the production of a cushion product, it can be achieved that the transverse width section of the paper strip being introduced into a deformation station for a deformation process is elevated compared to a conventional production apparatus so that the central area of the paper strip to be deformed provides more paper material for the deformation process. Thereby, a more shape-stabile, soft cushion product can be provided. It was surprisingly found out that for example during the usage of a roll-shaped paper strip supply induces an increase in tensile stress in the central paper strip area, which is counteracting a sagging of the paper strip in the central area so that the tendency to rip off of the paper strip caused by the sagging is reduced.

According to one embodiment of the apparatus for the production of a cushion product, the preforming station has a guiding surface in the vertical direction, from which the lifting unit induces a particularly harmonic and/or continuous upwardly increasing lifting of the paper strip by at least 100 mm, at least 25 mm and/or 100 mm at the most, 45 mm at the most, preferably about 25 mm.

According one embodiment, the lifting unit is designed to lift the central area of the paper strip at vertical level of the deformation area of the deformation station. Particularly, the embossing rollers have rolling circle diameters wherein the contact point of the rolling circle diameter defines a particularly tangent-compliant or secant-compliant contact point of a deformation level, which is orientated for example with respect to the rolling circle tangent or secant. The lifting unit can lift the central part of the paper strip up to the height of this deformation level±20 mm or ±10 mm. The lifting unit can lift the central area of the paper strip to at least the height of this deformation level. Preferably, the width of the lifting area is smaller or equal to the effective width of the embossing rollers (in their axial direction). In relation to the usual feeding of the paper strip by an in vertical direction almost flat central area, such a lifting by a lifting unit.

According to one embodiment of the apparatus according to the subject for the production of a cushion product, the lifting unit comprises a wedge. The wedge is formed gradually in the feed direction at least in sections. The wedge has a cross-section area in the transverse direction and vertical direction, narrowing upwards in the vertical direction starting from a lower basis of the wedge, which can be formed on the lower guiding surface of the preforming station. The wedge can have a bridge area of constant height, particularly at its most rear particularly highest section in the feed direction. The wedge can for example be formed of a plastic material such as POM or PLA or a metal material such as steel or aluminum. The edges of the wedge are rounded so that the paper strip can slide alongside the wedge without increased risk of rip-off.

According to a development of the cushion product production apparatus according to one embodiment, the wedge has in the feed direction a basis with a transverse width measuring at least 10 mm, at least 25 mm and/or at the most 100 mm, at the most 45 mm, about 35 mm in sections. The width of the basis of the wedge is smaller than the width of the embossing wheels. Particularly, the basis of the wedge has an increasing transverse width in the feed direction, at least in sections. Alternatively, or additionally, the basis of the wedge can have a constant transverse width in the feed direction, at least in sections. Preferably, at least one front part of the wedge in the feed direction is designed with increasing transverse width. Preferably, at least one rear part section of the wedge in the feed direction is designed with constant transverse width. The width, height, and/or shape of the wedge changes exclusively continuously or discontinuity-free in the feed direction.

According to one embodiment of the apparatus for the production of a cushion product, the preforming station comprises particularly two guiding members for facilitating the folding and/or rolling of the paper strip in the preforming station. The guiding members are arranged particularly between lateral chute inner walls of the preforming station, with decreasing transverse distance in the feed direction. Preferably, each guiding member can run parallel or essentially parallel to each chute inner wall. Preferably, one guiding member and one adjacent chute inner wall are respectively oriented towards each other, i.e. the right chute inner wall in the feed direction parallel to the right guiding member in the feed direction and the left chute inner wall in the feed direction parallel to the left guiding member in the feed direction. Using chute inner walls in combination with guiding members optimizes a folding and/or rolling effect of the preforming station, since the edges of the longitudinal edges of the paper strip hit against the chute inner walls when the paper strip is guided in the length direction or the feed direction, respectively, through the preforming station and being moved upwards or against each other by the chute inner walls. A kind of abutment is provided for the side edges of the paper strip by means of the guiding members arranged parallel to the chute inner walls, which realize a controlled folding and therefore uniform cushion quality. It was found to be advantageous to end one guiding member before another guiding member in the feed direction. The left guiding member for example can be shorter than the right guiding member or vice-versa. Preferably, at least one guiding member, both guiding members have a cone end which widens from an initially constant guiding member cross-section (diameter) to a larger guiding member final diameter. It shall be clear that the rear end of the guiding members in the feed direction are arranged with a distance to each other and to the deforming station. The lifting unit, the wedge, can be arranged in the transverse distance between the longitudinal ends of the guiding members.

The guiding members are arranged in a constant vertical distance to one of the lower guiding surfaces of the preforming station. Particularly, a down-holder unit, like a down-holder plate, for down-holding the central area of the paper strip can be arranged at the guiding members extending transversely between the guiding members in the feed direction at least in sections. A front-sided inlet section in the feed direction, such as a front fourth, front third or front half of the guiding members can for example be realized by a down-holder plate extending planarly between the guiding members. The particularly central height of the guiding members relatively to the guiding surface can be between 25 mm and 45 mm. A guiding member diameter at the inlet side can be between 10 mm and 30 mm. The guiding member diameter at the outlet side or end side of the cone section can be between 20 mm and 60 mm, for example be about 45 mm.

According to one embodiment, the lifting unit is designed to lift the central area of the paper strip until above a lower edge of the guide member and/or the down-holding unit, if applicable. The lifting unit is particularly designed to lift the central area of the paper strip at most to below the upper edge of the guiding members.

According to one embodiment, the distance in the feed direction from a rotation axis of the embossing rollers to the lifting unit is at least as large as an embossing roller radius. The distance from the rotation axis of the embossing rollers to the lifting unit, particularly to a rear end of the lifting unit in the feed direction, for example a rear wedge end in the feed direction, is at least 20 mm and at the most 200 mm, between 30 mm and 170 mm. The distance in the feed direction from the rotation axis of an embossing roller to the lifting unit is particularly smaller, up to 60 mm smaller, equally large or larger, up to 60 mm larger, than a distance from the rotation axis of an embossing roller to a rear end of a guiding member, the longer guiding member, in the feed direction. The embossing rollers have the same outer radius. The radius of one embossing roller can for example be between 3 cm and 8 cm, preferably between 4 cm and 6 cm.

According to one embodiment, the deformation station has an inner channel for guiding the preformed paper strip having channel walls with recesses, each being protruded by an embossing roller. The channel walls serve as aperture, allowing a guidance of the paper strip only in an area being necessary for the deformation of the paper strip with the embossing rollers. The paper strip is guided through the inner channel in such a way that a paper jam is prevented. The lower guiding surface of the deformation station particularly merges kink-free and/or with a transition edge inside the inner channel. A transition edge can be grounded. The transition from a lower guiding surface of the preforming station into the inner channel of the deforming station takes place harmonically in the vertical direction and/or feed direction. The height of the inner channel at the inlet of the deforming station is between 50 mm and 150 mm, between 70 mm and 105 mm. Preferably, a lower channel wall is followed alignedly by the lower guiding wall or the guiding surface of the preforming station. The upper channel wall can extend in the feed direction narrowingly to a lower channel wall.

One embodiment of the apparatus for the production of a cushion product further comprises a guiding unit like a slide edge or a deflection rollers, a pair of deflection rollers or a pairing of a deflection roller with a sliding edge, for aligning the paper trip for the preforming station is positioned upstream of the preforming station in the paper feed direction. The guiding unit allows a flat draw-in of the paper strip into the cushion product production apparatus in the transverse direction being undeformed in the transverse direction of the paper strip.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Figure 1:
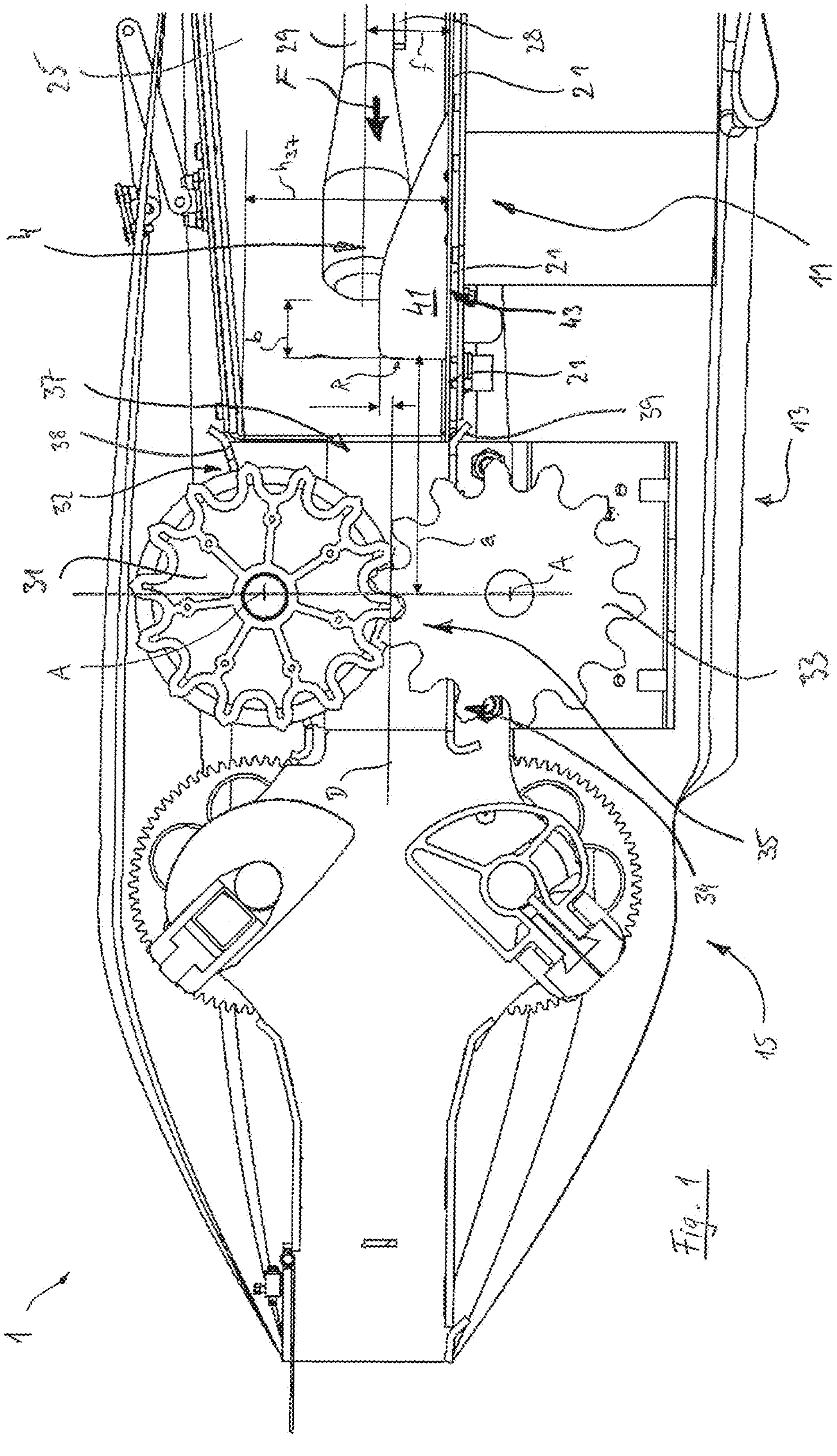
FIG. 1 is a cross-sectional side view of a cushion product production apparatus according to one embodiment.

The apparatus for the production of a cushion product according to one embodiment is generally attributed with the reference numeral 1. The cushion product production apparatus 1 comprises as components a preforming station and a deformation station 13 as well as a lifting unit 4 positioned upstream of the deformation station 13 in the feed direction F. The lifting unit 4 can be realized for example pneumatically, by a stream of air, mechanically, for example by a ramp, a freely turnable wheel, or as shown exemplarily, a wedge 41. The cushion product production apparatus 1 shown in the Figures further comprises a rotation cutter 15 in order to cut separate cushion pillows from the tube-like cushion product 3 having two crumple hollow spaces 7, 9 extending in the longitudinal direction L. Instead of a rotation cutter 15, also a different mechanism, for example a teethed blade at the exit of the cushion product production apparatus 1 for tearing off a long cushion strand, can be provided.

The paper strip 5 is fed through the apparatus 1 along a feed direction F in that feed or embossing rollers 31, 33 draw in the paper strip 5 from a paper strip supply not shown in detail, a Leporello stack or a roll. The embossing rollers 31 and 33 can therefore serve in functional union to feeding the paper strip 5 in the feed direction F as well as to the forming of the paper 5 into a cushion product. At least one feed roller 31, 33 is driven by an electromotor not shown in detail, which can also drive a rotation cutter 15. The rotation cutter 15 can also have an own electro motor.

In the course of the production of the cushion product 3, the paper strip 5 is passing the apparatus 1 as the paper strip 5 is at first drawn in at the guiding unit 17, being realized by two deflection rollers 18, 19 extending in transverse direction Q into the cushion product production apparatus 1. The paper strip 5 arrives at the preforming station 11, which chute-like in the feed direction F being positioned in the feed direction behind the guiding station 17 until it leads to the rear side of the deforming station 13 in the feed direction F. The paper strip 5 is preformed in the preforming station 11 as being compressed at least in the transverse direction Q, for example in that the longitudinal edges of the paper strip 5 are folded by the lateral chute inner walls 23, 25 optionally by means of guiding members 27, 29 and being rolled, if applicable. The preformed paper strip 5 is then further fed into an inner channel 37 of the deforming station in which the embossing wheels 31, 33 are protruding.

The embossing wheels 31, 33 are catching the paper strip with their teeth engaging each other in the deformation area 35 and form the same to a cushion product 3 having two crumple hollow spaces 7, 9 extending in the longitudinal direction L and a wavelike imprint profile 8 being formed between the crumple hollow spaces 7 and 9 by the embossing rollers 31, 33. The cushion product 3 is ejected from the apparatus 1 in the following feed procedure as shown schematically in FIG. 3. Before the ejection from the apparatus 1, the cushion product 3 can be fed along or respectively through a cutting station such as the rotation cutter 15 shown here exemplarily, which can cut off a single pillow from the strand-shaped cushion product 3 with one (rotation) cutting stroke.

Figure 2:
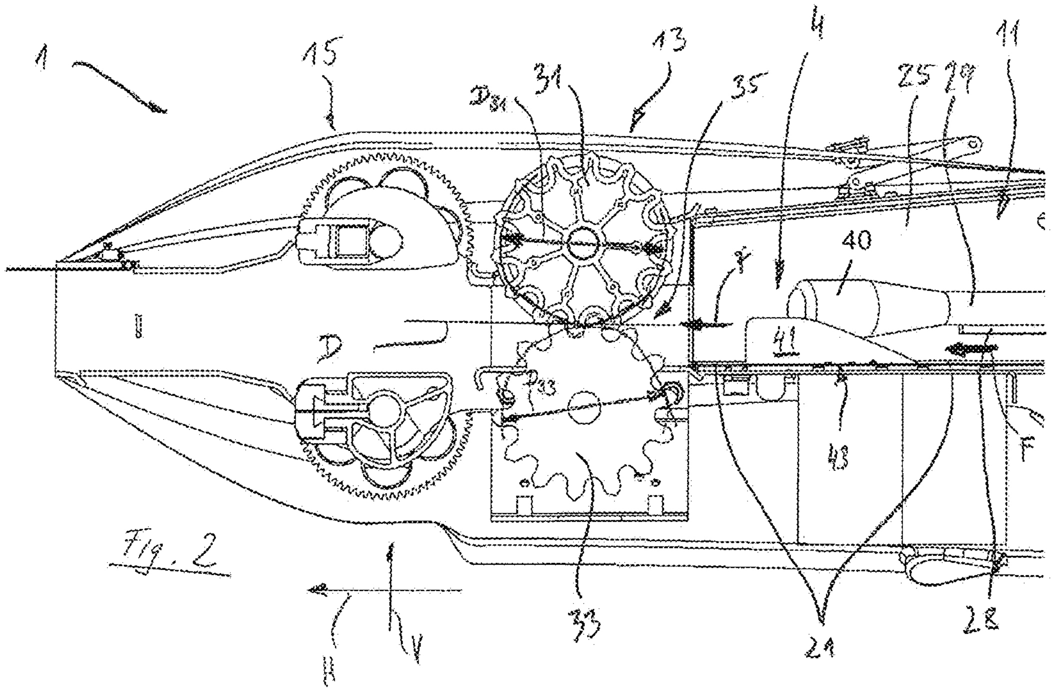
FIG. 2 is a side view of a cushion product production apparatus according to one embodiment according to FIG. 1.
Figure 3:
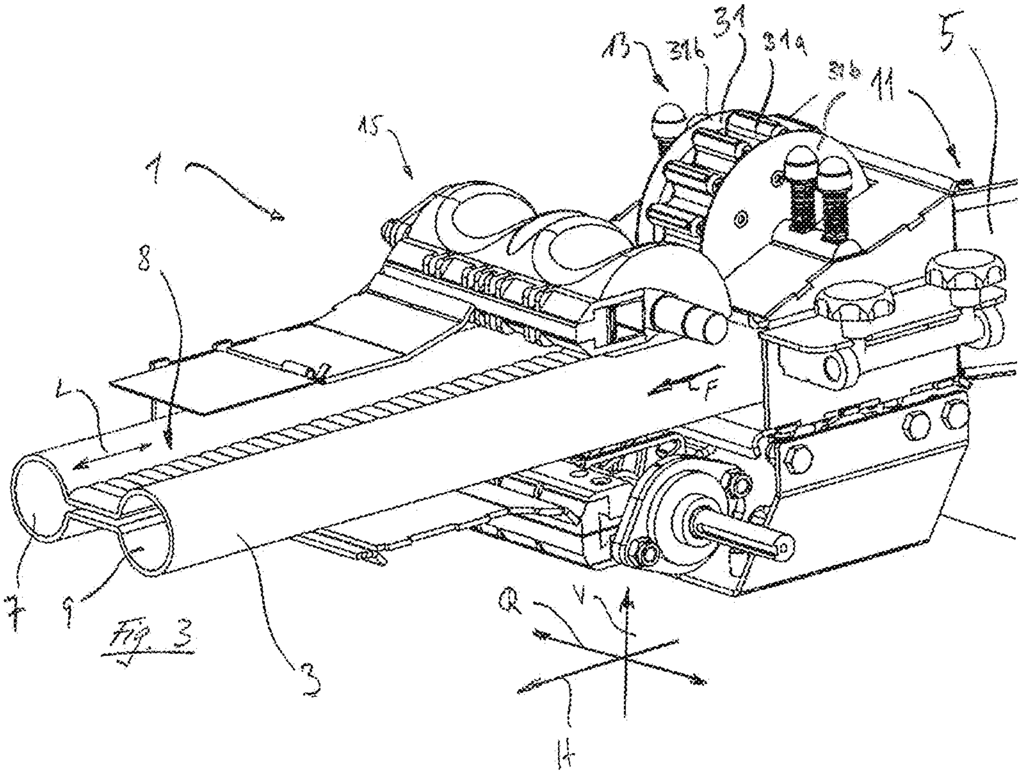
FIG. 3 is a perspective sectional view of the production apparatus according to one embodiment according to FIG. 2.

The deformation station 13 is shown in the FIGS. 1 and 2 in cross-section. As shown in FIG. 3, the upper feed roller 31 comprises of a embossing teeth wheel 31*a* having a side disc 31*b* rotating with the embossing teeth wheel to the left and to the right transverse to the feed direction F. The side discs 31*b* have just about the same as or a slightly smaller outer diameter than the embossing wheel 31. The lower embossing wheel 33 only comprises of an embossing teeth wheel equally wide in the transverse direction Q as the teeth while 31*a* of the upper embossing roller 31. The teeth of the embossing rollers 31 and 33 engage into each other in a deformation area 35 for feeding and deforming the paper strip 5. The pitch circle diameter D31 of the upper embossing wheel 31 of the embodiment shown here exemplarily is as large as the pitch circle diameter D33 of the lower embossing wheel 33. The axial distance of the embossing rollers 30, 33 more or less equals the sum of the pitch circle diameters. A deformation plane D is defined by a mutual pitch circle tangent in the contact are of the embossing rollers 31, 33. The deformation D is located in the vertical direction, approximately in the middle of the feed height of the paper strip 5 in the feed direction F.

The deformation station 13 has, as explained above, an inner channel 37 being limited in the vertical direction by a lower channel wall 38 and an upper channel wall 39, each having a recess 32, 34 for the upper or lower embossing roller 31, 33, respectively, coming into touch contact with the paper strip 5 operation-conformingly, always having a velocity component in the horizontal direction H being oriented in the same direction as the feed direction F. An accumulation of the paper strip 5 and the embossing rollers 31, 33 with the possible outcome of a paper jam is thereby prevented. The pitch circle diameter D31 or D33 of the embossing rollers 31, 33, respectively, are preferably between 8 and 12 cm and preferably below 10 cm. The width of the embossing roller 31, 33 in transverse directly is commonly below 30 cm, preferably below 20 cm, particularly less than 10 cm. The transverse width of the embossing roller 31, 33 can for example be about 30 mm to about 70 mm, preferably between 30 and 50 mm.

Figure 4:
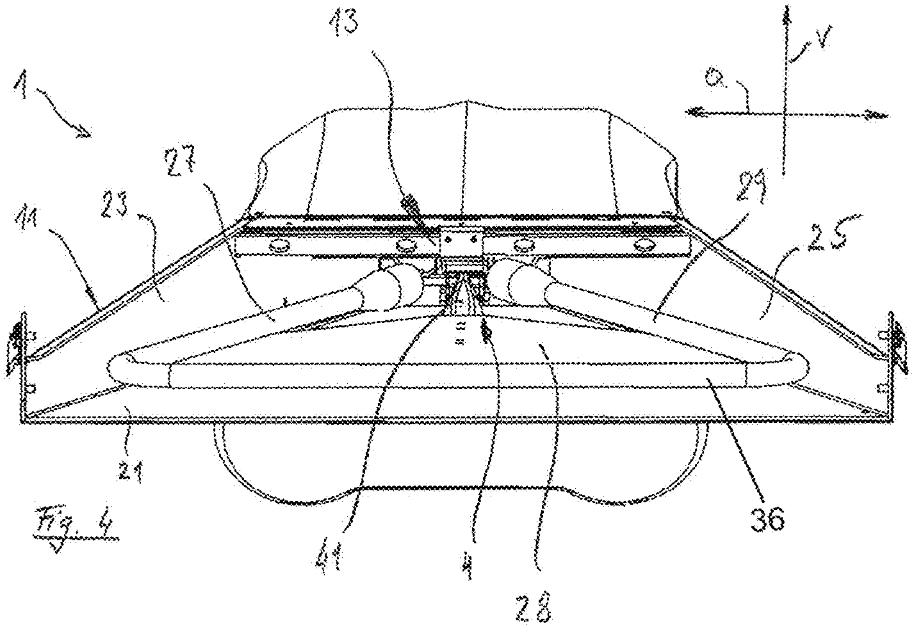
FIG. 4 is a view of the cushion product production apparatus according to one embodiment according to FIG. 1 from the rear side.
Figure 5:
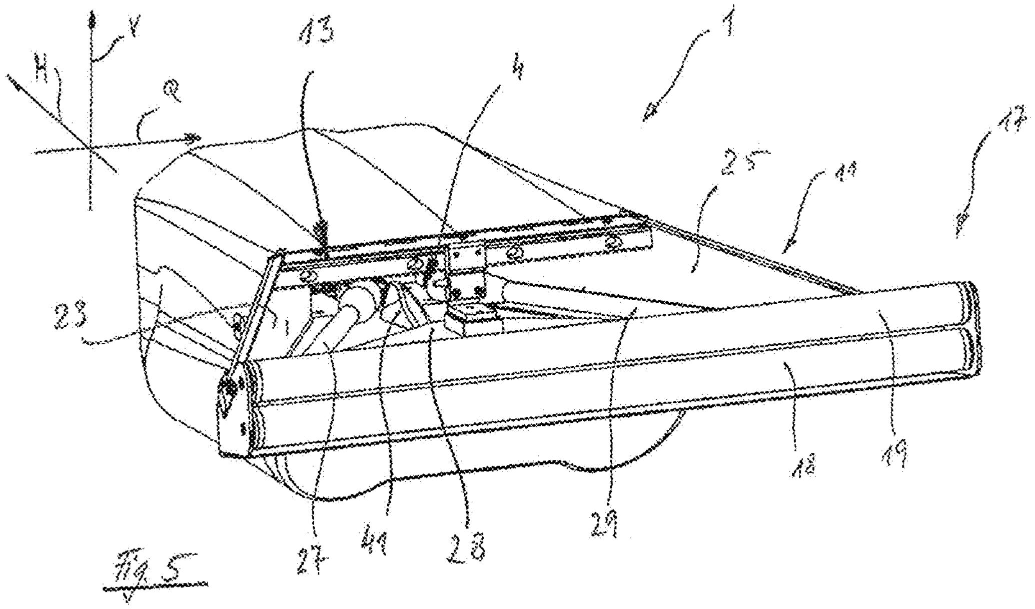
FIG. 5 is a perspective view of a cushion product production apparatus according to one embodiment according to FIG. 1 from a diagonal back side.

FIGS. 1 and 2 show the rear part of the preforming station 11 in the feed direction F. FIGS. 4 and 5 show a rear view or a perspective view, respectively, of the exemplarily shown embodiment of the cushion product production apparatus 1 according to one embodiment with view on the preforming station 11, wherein a cover of the preforming station 11 is not shown for being able to see the inner components. It shall be clear that operation-accordingly a cover extends completely in transverse direction Q and horizontal direction H over the preforming station, on the opposite side of the guiding surface 21 of the preforming station 11.

The lower guiding surface 21 of the preforming station 11 shapes the base of the preforming station 11 in the vertical direction V. The lower guiding surface 21 extends in transverse direction between a left side wall 23 and a right side wall 25. The side walls 23 and 25 lead to the inlet of the deforming station 13 chute-like. The longitudinal edges of the paper strip 5 are guided against the chute inner walls 23-25 of the preforming station 11 during the transport of the paper strip 5 through the cushion product production apparatus 1 in order to fold the longitudinal edges of the paper strip 5.

The folding and rolling of the longitudinal ends of the paper strip is supported by guiding members 27 or 29, respectively, each extending parallel to one of the chute inner walls 23 or 25. The left guiding member 27 in the feed direction ends in front of the right guiding member 29 in the feed direction F. The distance of the right guiding member 29 to the deformation station 13 is therefore smaller than the distance of the left guiding member 27 to the deformation station 13. The longitudinal ends 40 of the guiding members are widening cone-like. The guiding members 27 and 29 may be connected together by a connecting member 36. For example, the connecting member 36 may extend in the transverse direction Q and connect to upstream ends of the guiding members 27 and 29 to connect the guiding members 27 and 29 together. In this arrangement, the longitudinal ends 40 of the guiding members 27 and 29 are located downstream of the upstream ends in the feed direction F.

A down-holder plate 28 is attached at the bottom side of both of the guiding members 27 and 29 along the front half of the guiding members 27 and 29 in the feed direction F. The down-holder plate extends completely between the guiding members 27 and 29 being positioned above opposingly to the guiding surface 21.

The paper strip 5 is, after entering into the apparatus 1 between the deflection rollers 18 and 19 of the guiding station 17, guided underneath the down-holder plate 28 and above the guiding surface 21. The down-holder plate 28 has a convexly protruding section in the central are of the preforming station 11 in the feed direction F ending several centimeters before the guiding members 27 and 29, particularly already before their widened end sections. A lifting unit 4 being exemplarily designed as a wedge 41 is arranged between the in the feed direction rear end of the down-holder plate 28 and the deformation station 13. The central area of the paper strip 5 being guided between the guiding surface 21 and the down-holder plate 28 (compare for example FIG. 2) is guided in the feed direction F against the lifting unit 4 during the cushion product production which is then lifting the central area of the paper strip. In order to prevent damage or even ripping and an eventual paper jam, the wedge 41 is continuously directing upwards from the guiding surface 21.

The lower base 43 is in contact with the guiding plate 21. A guiding wedge 41 is shown in detail in FIGS. 6*a*, 6*b*, 6*c* and 6*d*. As conceivable in the perspective view according to FIG. 6*d*, the wedge has an adaptable cross-sectional area in the feed direction F, wherein the cross-sectional areas being discussed here extend vertically in one plane in the transverse direction Q and vertical direction V on the guiding surface 21 and/or the deformation plane D.

The wedge has a sloping ramp surface 42 spanning an angle $\alpha$ with the flat guiding surface 21 of between 130° and 160°, particularly 155°. As shown, the ramp surface 42 can be designed as surface between the guiding surface 21 and a upper end of the wedge 41 in the vertical direction V sloping upwards continuously, particularly evenly.

The highest point of the wedge 41 can run as a saddle area 45 with a longitudinal extension in the horizontal direction, that means across, particularly transversely to the vertical direction V as well to the transverse direction Q. The length LS of the saddle area 45 is between 5 mm and 35 mm, preferably about 10 mm. The vertical height hK of the wedge 41 is between 25 mm and 45 mm, preferably about 35 mm. The wedge length LK can be between 80 mm and 120 mm and is preferably about 100 mm.

The preferable largest transverse width bK of the wedge 41 can preferably be between 10 mm and 60 mm, between 25 mm and 45 mm, preferably about 35 mm. The wedge 41 can for example have in its rear section 47 in feed direction F a maximal transverse width bK of about 35 mm. In a front part in the feed direction F, the wedge 47 can widen in transverse direction Q wedge-like. The wedge 41 can have a sweep section 46 with a sweep angle $\gamma$, wherein the sweep angle $\gamma$ is 25° at the most, particularly 15° at the most. The sweep angle $\gamma$ can approach 0° and in so far be infinitesimal.

Figures 6A, 6B, 6C, 6D:
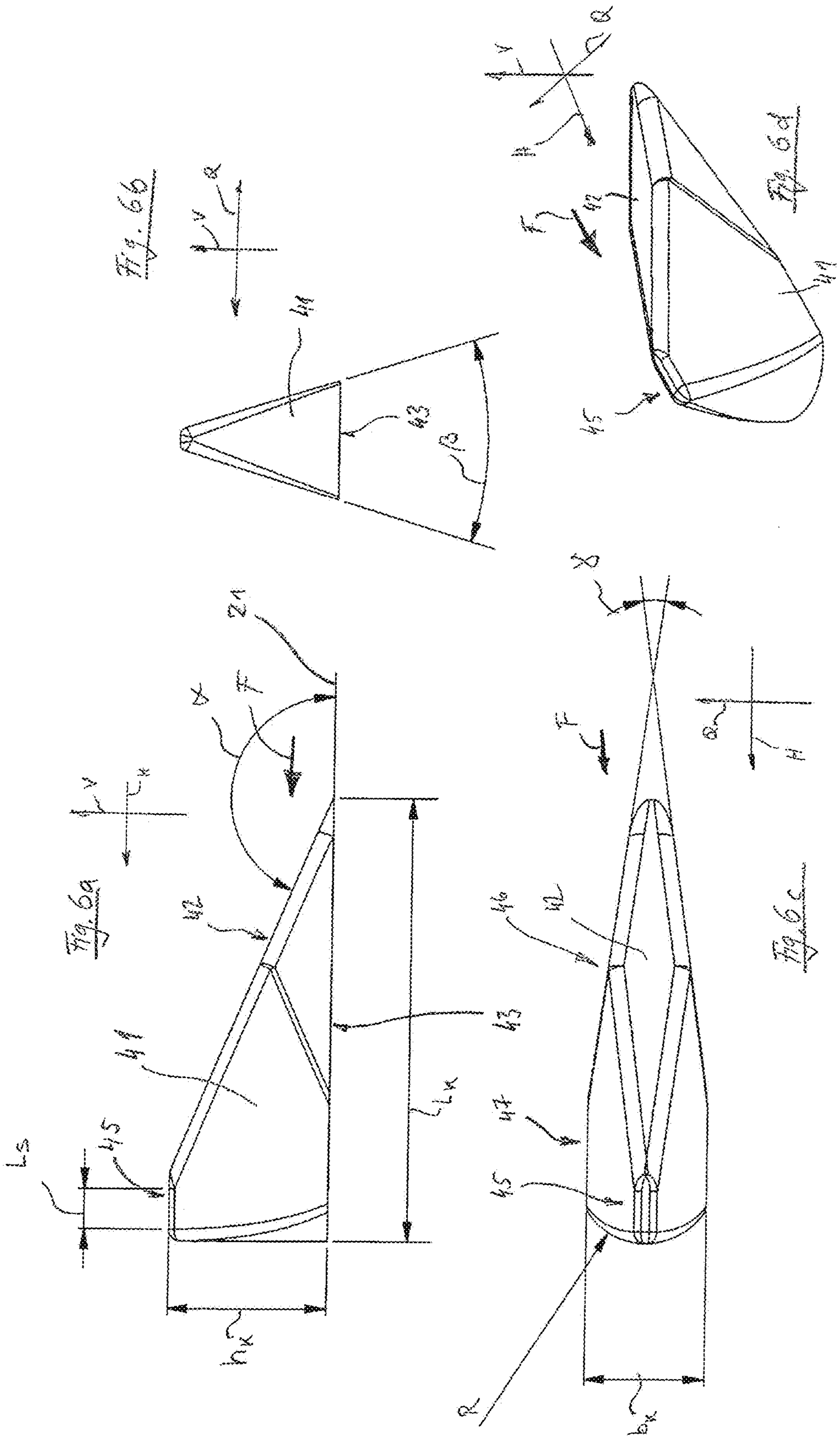
FIG. 6*a* is a side view of a wedge.
FIG. 6*b* is a front view of the wedge according to FIG. 6*a;*
FIG. 6*c* is a top view of the wedge according to FIG. 6*a*.
FIG. 6*d* is a perspective view of the wedge according to FIGS. 6*a* to 6*c* for a cushion product production apparatus according to one embodiment.

The front view of FIG. 6*b* gives a hint of the cross-sectional area of the wedge 41. The cross-sectional area of the wedge 41 can narrow upwardly, starting from the base 43 in the vertical direction V, for example with a narrowing angle $\beta$, being 45° at the most, particularly about 35°. The narrowing angle $\beta$ can also be realized infinitesimally, practically equaling 0°.

The distance a in the feed direction F between the rear end or the rear side A, respectively, of the wedge 41 in the feed direction F and the axis A of the embossing rollers 31, 33 is smaller than 200 mm. The distance a is in the range between 30 mm and 170 mm.

The distance b in the feed direction F between the end of the longer feed member 29 and the rear part of the wedge 41 in the feed direction F is less than 100 mm, particularly about 60 mm or less. The rear wedge end in the feed direction F is located behind the end of the guiding members 27 or 29, respectively. Nevertheless, it is also thinkable that the rear side R of the wedge already ends in the feed direction F in front of the guiding members 27, 29.

The feed members 27, 29 are arranged in a distance f of 25 mm to 45 mm with their respective member axis parallel above the guiding surface 21. The top edge of the wedge 41 is particularly arranged up to 10 mm above or up to 10 mm below the deformation plane D. The top edge of the wedge 41 is located about 10 mm±5 mm above the deformation plane D.

The attributes disclosed in the preceding description, the Figures and the claims, can be used in both separately or in arbitrary combination for the realization of the invention in the different embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

LIST OF REFERENCE NUMERALS

1 cushion product production apparatus
3 cushion product
4 lifting unit
5 paper strip
7, 9 crumple hollow spaces
8 imprint profile
11 preforming station
13 deformation station
15 rotation cutter
17 guiding unit
18, 19 deflection rollers
21 guiding surface
23, 25 chute inner wall
27, 29 guiding member
28 down-holder plate
31, 33 embossing roller
31*a* embossing teeth wheel
31*b* side disc
32, 34 recess
35 deformation area
37 inner channel
38, 39 channel wall
41 wedge
42 ramp surface
43 base
45 saddle area
46 sweep section
47 section
A axis
D deformation plane
F feed direction
H horizontal direction
L longitudinal direction
Q transverse direction
R rear side
V vertical direction

I claim:

1. An apparatus for production of a cushion product from a single or multilayer continuous paper strip, comprising:

a chute-like preforming station configured to compress the paper strip in a transverse direction that is transverse to a feed direction, the preforming station including a lifting unit having a wedge being formed in the feed direction at least in sections sloping upwards, the wedge including:

a cross-sectional area in the transverse direction narrowing upwardly from a lower base of the wedge in a vertical direction to an upper portion, and a sloping ramp surface that increases in height as the sloping ramp surface extends in the feed direction, the sloping ramp surface including a first portion having an increasing transverse width in the feed direction and a second portion having a decreasing transverse width in the feed direction, the second portion being located downstream of the first portion in the feed direction, wherein the wedge is configured to lift a central area of the paper strip without lifting other areas of the paper strip, the central area of the paper strip to be lifted being centrally arranged in a transverse direction of the paper strip, and the narrow upper portion of the wedge being configured to contact the central area of the paper strip to lift the central area of the paper strip; and a deformation station following the preforming station and positioned downstream of the wedge in the feed direction of the paper strip, the deformation station having two embossing rollers engaging into each other in a deformation area in order to form the paper strip to a cushion product with at least one crumple hollow space extending in a longitudinal direction.

2. The apparatus according to claim 1, wherein the preforming station comprises a lower guiding surface from which the lifting unit causes a harmonic or continuous upward sloping lifting of the paper strip by at least 10 mm.

3. The apparatus according to claim 1, wherein the lifting unit is configured to lift the central area of the paper strip at vertical height of the deformation area, wherein the embossing rollers comprise a pitch circle diameter whose contact point defines a deformation plane, wherein the lifting unit lifts the central area of the paper strip up to at least the height of the deformation plane.

4. The apparatus according to claim 1, wherein the wedge further comprises a saddle area of constant height at its rear section in the feed direction.

5. The apparatus according to claim 4, wherein the lower base has a transverse width in the feed direction measuring section-wise at least 10 mm, wherein the lower base has, at least in sections, an increasing transverse width in the feed direction or the base having, at least in sections, a constant transverse width in the feed direction.

6. The apparatus according to claim 1, wherein a distance from a rotation axis of one of the embossing rollers to the lifting unit in the feed direction is at least as great as an embossing roller radius, wherein the distance from the rotation axis of one of the embossing rollers to the lifting unit in the feed direction is different from a distance from the rotation axis of one of the embossing rollers to a rear end of the first guiding member and/or the second guiding member in the feed direction.

7. The apparatus according to claim 1, wherein the deformation station has an inner channel configured for guiding the preformed paper strip, having channel walls with recesses, each being protruded by an embossing roller, wherein a lower guiding surface of the deformation station merges kink-free or with a transition edge in the inner channel.

8. The apparatus according to claim 1, further comprising a guiding unit is positioned upstream of the preforming station in the feed direction and configured to adjust the paper strip for the preforming station.

9. The apparatus according to claim 8, wherein the guiding unit comprises a sliding edge or a deflection roller.

10. The apparatus according to claim 1, wherein the compression comprises a folding or a rolling of the paper strip.

11. The apparatus according to claim 1, wherein the lifting unit is configured to leave free spaces on both sides of the lifting unit for generating hollow crumple spaces of material web.

12. The apparatus according to claim 1, wherein the other areas of the paper strip are areas that are not the central area of the paper strip.

13. The apparatus according to claim 1, wherein the preforming station further comprises:

first and second guiding members configured to support a folding or rolling of the paper strip in the preforming station, the first and second guiding members being disposed between first and second lateral chute inner walls of the preforming station, wherein the first and second guiding members respectively extend parallel to the first and second lateral chute inner walls in the feed direction; and a connecting member extending in the transverse direction being configured to connect the first and second guiding members together, the connecting member being connected to upstream ends of the first and second guiding members.

14. The apparatus according to claim 13, wherein the guiding members are aligned in a constant vertical distance to a lower guiding surface of the preforming station, the preforming station further comprising a holding unit that is configured hold down the central area of the paper strip between the holding unit and the lower guiding surface, wherein the holding unit is arranged at the first and second guiding members that are extending in the feed direction and at least in sections transversely between the first and second guiding members.

15. The apparatus according to claim 14, wherein the wedge is configured to lift the central area of the paper strip up to above a lower edge of the first and second guiding members or of the holding unit, wherein the wedge lifts the central area of the paper strip up to below an upper edge of the first and second guiding members.

16. The apparatus according to claim 13, wherein the wedge is disposed between downstream ends of the first and second guiding members in the transverse direction, the downstream ends of the first and second guiding members being downstream of the upstream ends of the first and second guiding members in the feed direction.

17. The apparatus according to claim 13, wherein a downstream end of the first guiding member is closer to the deformation station in the feed direction than a downstream end of the second guiding member, the downstream ends of the first and second guiding members being downstream of the upstream ends of the first and second guiding members in the feed direction.

18. The apparatus according to claim 13, wherein downstream ends of the first and second guiding members are cone-shaped, the downstream ends of the first and second guiding members being downstream of the upstream ends of the first and second guiding members in the feed direction.

19. The apparatus according to claim 13, wherein the first and second guiding members and the connecting member are cylindrically shaped.

* * * * *